(12) United States Patent
Wass et al.

(10) Patent No.: US 10,321,354 B2
(45) Date of Patent: Jun. 11, 2019

(54) METHODS, NETWORK NODES, AND COMPUTER PROGRAM PRODUCTS FOR PROVIDING ACCESS POINT NAME (APN) BASED GROUP CONGESTION CONTROL

(71) Applicant: Telefonaktiebolaget L M Ericsson (publ), Stockholm (SE)

(72) Inventors: Mikael Wass, Sätila (SE); Peter Hedman, Helsingborg (SE); Hans Rönneke, Kungsbacka (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 302 days.

(21) Appl. No.: 14/877,252

(22) Filed: Oct. 7, 2015

(65) Prior Publication Data
US 2016/0100450 A1 Apr. 7, 2016

Related U.S. Application Data

(63) Continuation of application No. PCT/EP2015/073090, filed on Oct. 7, 2015.

(60) Provisional application No. 62/060,755, filed on Oct. 7, 2014.

(51) Int. Cl.
*H04W 28/02* (2009.01)
*H04W 4/08* (2009.01)
*H04W 76/18* (2018.01)

(52) U.S. Cl.
CPC ......... *H04W 28/0289* (2013.01); *H04W 4/08* (2013.01); *H04W 76/18* (2018.02)

(58) Field of Classification Search
CPC .......... H04W 28/0289; H04W 76/027; H04W 76/021
See application file for complete search history.

(56) References Cited

U.S. PATENT DOCUMENTS

| | | | |
|---|---|---|---|
| 2010/0323700 A1* | 12/2010 | Bachmann | H04W 36/0066 455/436 |
| 2013/0010756 A1* | 1/2013 | Liang | H04W 36/18 370/331 |
| 2013/0088956 A1* | 4/2013 | Zhou | H04W 4/08 370/230 |

(Continued)

FOREIGN PATENT DOCUMENTS

| | | |
|---|---|---|
| JP | 2010-537529 A | 12/2010 |
| JP | 2013-526160 A | 6/2013 |
| WO | 2009/024501 A1 | 2/2009 |

OTHER PUBLICATIONS

3GPP TS 23.060 V10.2.0, "3rd Generation Partnership Project; Technical Specification Group Services and System Aspects; General Packet Radio Service (GPRS); Service description; Stage 2 (Release 10)," Dec. 2010, 316 pages.

(Continued)

*Primary Examiner* — Mansour Oveissi
(74) *Attorney, Agent, or Firm* — Rothwell, Figg, Ernst & Manbeck, p.c.

(57) ABSTRACT

This disclosure describes an APN based group congestion control mechanism. The mechanism utilizes a Group Defining APN (GDA) for defining terminal groups. To add a terminal to a particular terminal group, the network operator need only add a GDA to a list of APNs already included in the terminal's subscription data.

20 Claims, 8 Drawing Sheets

(56) References Cited

U.S. PATENT DOCUMENTS

| | | | | |
|---|---|---|---|---|
| 2013/0136072 A1* | 5/2013 | Bachmann | ............... | H04W 4/00 370/329 |
| 2013/0223230 A1* | 8/2013 | Swaminathan | ....... | H04W 76/02 370/241 |
| 2016/0073281 A1 | 3/2016 | Zhou et al. | | |
| 2018/0007614 A1* | 1/2018 | Velev | ................... | H04W 48/06 |

OTHER PUBLICATIONS

3GPP TS 24.301 V10.2.0, "3rd Generation Partnership Project; Technical Specification Group Core Network and Terminals; Non-Access-Stratum (NAS) protocol for Evolved Packet System (EPS); Stage 3 (Release 10)," Mar. 2011, 315 pages.

3GPP TS 24.008 V10.2.0, "3rd Generation Partnership Project; Technical Specification Group Core Network and Terminals; Mobile radio interface Layer 3 specification; Core network protocols; Stage 3 (Release 10)," Mar. 2011, 546 pages.

3GPP TS 23.401 V10.2.0, "3rd Generation Partnership Project; Technical Specification Group Services and System Aspects; General Packet Radio Service (GPRS) enhancements for Evolved Universal Terrestrial Radio Access Network (E-UTRAN) access (Release 10)," Dec. 2010, 276 pages.

International Search Report and Written Opinion issued in corresponding International application No. PCT/EP2015/073090, dated Nov. 23, 2015 12 pages.

NTT Docomo et al., "Group specific congestion control," Change Request, S2-141773, 3GPP TSG-SA2 Meeting #103, May 2014, 10 pages.

"3rd Generation Partnership Project; Technical Specification Group Services and System Aspects; General Packet Radio Service (GPRS) enhancements for Evolved Universal Terrestrial Radio Access Network (E-UTRAN) access Release 13)," 3GPP TS 23.401 V13.0.0, Sep. 2014, 308 pages.

"3rd Generation Partnership Project; Technical Specification Group Services and System Aspects; Group based Enhancements; (Release 13)," 3GPP TR 23.769 V0.2.0, Jul. 2014, 17 pages.

Japanese Office Action with English language Summary issued in corresponding Japanese Application No. 2017-518445, dated Jun. 12, 2018, (6 pages).

Huawei, "Congestion control by SGSN/MME", TD S2-103158, 3GPP TSG SA WG2 Meetings #79E (Electronic), Elbonia, Jul. 6-13, 2010, (5 pages).

* cited by examiner

METHODS, NETWORK NODES, AND COMPUTER PROGRAM PRODUCTS FOR PROVIDING ACCESS POINT NAME (APN) BASED GROUP CONGESTION CONTROL

CROSS-REFERENCE TO RELATED APPLICATIONS

This application is a continuation of international patent application no. PCT/EP2015/073090, filed on Oct. 7, 2015, which claims priority to U.S. provisional application No. 62/060,755, filed on Oct. 7, 2014; this application also claims the benefit of U.S. application No. 62/060,755. The above identified applications are incorporated by reference.

TECHNICAL FIELD

Disclosed herein are, for example, methods, network nodes, and computer program products for providing Access Point Name (APN) based group congestion control.

BACKGROUND

A congestion control mechanism known as "APN based congestion control" is known. This mechanism is used to restrict a terminal's (e.g., a wireless communication device's) access to a network based (e.g., the Internet or other network) based on an APN that the terminal seeks to utilize for connectivity to the network. An APN may be the name of an access point (e.g., gateway) between a mobile network (e.g., an Long Term Evolution (LTE) core network) and another network (e.g., the Internet). As a specific example, in a GPRS backbone, an APN is a reference to a Gateway GPRS support node (GGSN). In some implementations, an APN is composed of a network identifier and an operator identifier.

Consider a terminal that seeks to access a network using an APN having a value of "network-id.operator-id". In such a scenario, a management entity (ME) of a core network (e.g., a Mobile Management Entity (MME) or (SGSN)) may receive from the terminal a request for connectivity (e.g., a request to establish a context or a connection), which request may include the APN (or the APN may be defined as a default APN in a subscription record for the terminal). Based on information regarding the APN, the management entity may deny the terminal's connectivity request. For instance, the ME may deny the request based on: whether the number of active Evolved Packet System (EPS) bearers for APN exceeds a threshold; whether the rate of EPS Bearer activations for APN exceeds a threshold; whether one or more Packet Data Network (PDN) gateways (GWs) of the APN are not reachable or indicated congestion to the ME; the rate of MM signaling requests associated with the devices with a particular subscribed APN; and/or Setting in network management.

SUMMARY

It has been observed in networks that the congestion control realized with APN based congestion control is not sufficiently flexible and does not allow multiple groups to be individually controlled if a common APN is used for connectivity. This problem arises, for example, when there is a need to apply separate congestion control for multiple groups using the same general internet APN. The alternative for operators are to activate congestion control that has a broader impact than needed or to deploy dedicated APNs for each group that requires individual congestion control.

This disclosure introduces solutions to this problem. In one embodiment, a terminal's subscriber data (e.g., a subscriber record) is modified to include one or more "Group Defining APNs". A Group Defining APN (GDA) is an APN that identifies a terminal group. Furthermore, a GDA is not used for connectivity, but is used as the group defining parameter by the node that implement and enforces APN based congestion control. A terminal for which APN based group congestion control shall be applied would then, in addition to being assigned APN(s) for connectivity, be assigned a Group Defining APN (GDA). Because a GDA is not used for connectivity, it follows that a GDA cannot be used as a Default APN by the network as that would cause connectivity failure when the terminal does not specify an APN at connectivity request.

In one aspect of the disclosure there is provided a method for enabling group control of terminals. In some embodiments, the method is performed by a management entity (ME) (e.g., an MME or SGSN) and includes the following steps: 1) the management entity receiving a message comprising a terminal identifier identifying a terminal; 2) the management entity obtaining subscription data for the terminal (e.g., subscription data from a subscription profile linked to the terminal identifier included in the message), the subscription data comprising a list of access point names (APNs); and 3) the management entity using the list of APNs to determine that the terminal is a member of a particular group of terminals.

In some embodiments, the method further comprises the management entity storing a group identifier identifying the particular group of terminals, and the step of using the list of APNs to determine that the terminal is a member of the particular group of terminals, comprises determining that the list of APNs includes an APN that matches the group identifier. In some embodiments, the matching APN is a Group Defining APN (GDA), which is not used for providing any connectivity to the terminal.

In some embodiments, the list of APNs comprises a first APN that is used as a default APN and a second APN that is a Group Defining APN (GDA), wherein the second APN is different than the first APN. In some embodiments, the list of APNs comprises a first APN, which comprises a first network identifier, and the list of APNs further comprises a second APN, which comprises a second network identifier. The first APN may further comprise a first operator identifier and the second APN may further comprise a second operator identifier.

In some embodiments, the list of APNs comprises a first APN for use in identifying one or more of: an access point and a packet data network (PDN), and the list of APNs further comprises a second APN solely for use in identifying a terminal group to which the terminal belongs.

In some embodiments, the request message is a connectivity request message (e.g., an Activate PDP context message or a PDN connectivity request message) that comprises an APN, and the method further comprises: the management entity determining that a congestion parameter associated with the group identifier exceeds a congestion threshold; and the management entity, in response to the connectivity request message and as a result of determining that the congestion parameter associated with the group identifier exceeds the congestion threshold, transmits to the terminal a connectivity rejection message. The connectivity rejection message indicates to the terminal that the network resources are not available to provide the requested connectivity.

Alternatively (or in addition), the connectivity rejection message indicates to the terminal an amount of time the terminal should wait before resending the connectivity request. In some embodiments, the congestion parameter identifies at one of: 1) the number of EPS bearers active for the terminals that are members of the group identified by the group identifier; and 2) a rate of EPS Bearer activations.

In another aspect there is provided a congestion control method performed by a management entity. The method may begin with the management entity receives a connectivity request comprising a terminal identifier identifying a terminal. The management entity then obtains subscription data for the terminal, the subscription data comprising a set of two or more access point names (APNs). The management entity determines whether any one of the APNs included in set of APNs is congested. And, as a result of determining that any one of the APNs included in set of APNs is congested, the management entity rejects the connectivity request.

Advantages

An advantage of the disclosures is that it provides a needed mechanism to the operator with minimal changes to the network. Only one network entity needs to be updated to achieve this and the changes are limited to internal node logic without impact to protocols or data structures shared between network entities. Unnecessary configuration and deployment is avoided to make this solution more cost efficient than the currently available or proposed alternatives. The invention will simplify the deployment of groups that can be individually controlled, and this can increase the flexibility in operator offerings to e.g. m2m service providers

BRIEF DESCRIPTION OF THE DRAWINGS

The accompanying drawings, which are incorporated herein and form part of the specification, illustrate various embodiments.

DETAILED DESCRIPTION

Figure 1:
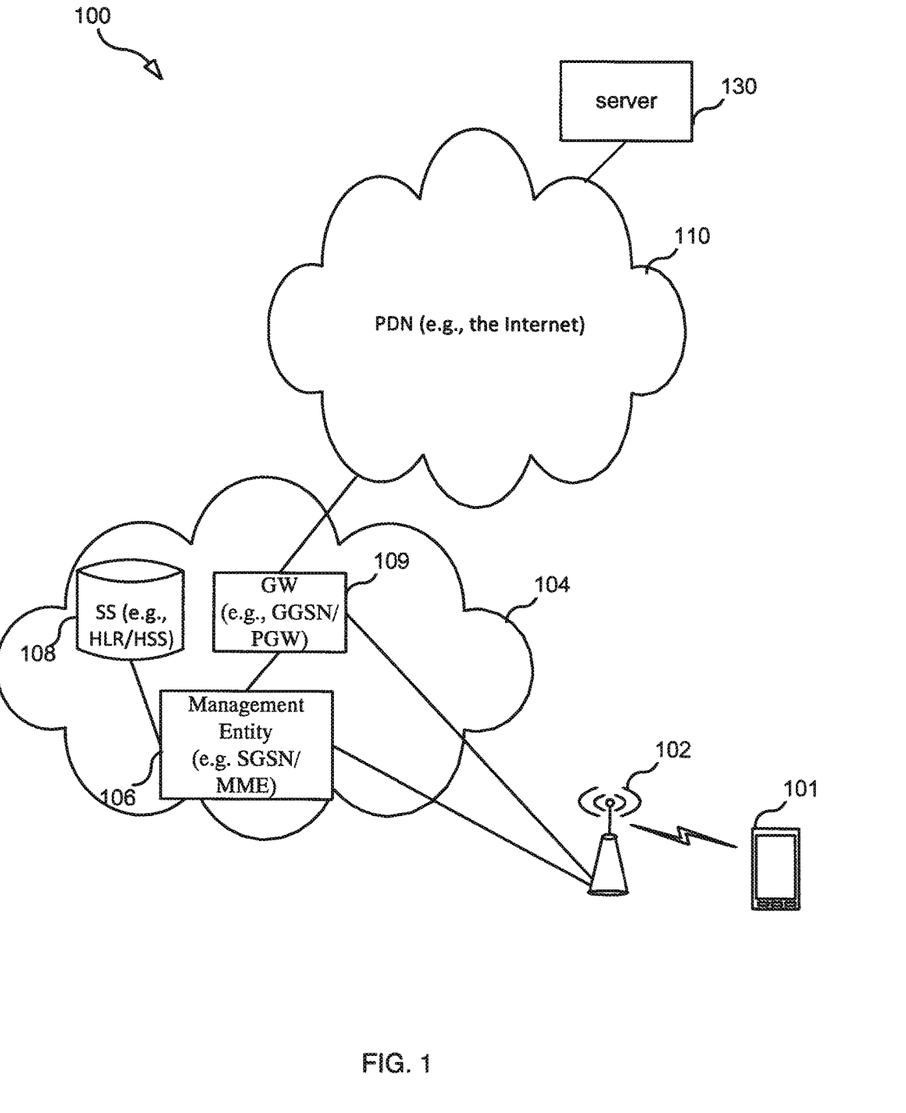
FIG. 1 illustrates a system according to some embodiments.

FIG. 1 illustrates a system 100 according to some embodiments. System 100 enables a terminal 101 (e.g., a wireless communication device such as smartphone, a sensor, a computer, etc.) to communicate with a second terminal (e.g., a server computer) 130. As shown in FIG. 1, terminal 101 is attached to a core network 104 via an access network 102. The access network 102 may be a radio access network (RAN) (e.g., UTRAN, E-UTRAN, GERAN, GRAN, WiFi, WiLan, etc.) and core network 104 may be a 2G, 3G, 4G, LTE, etc. core network.

Core network 104 includes a gateway 109, which is connected to a management entity (ME) (e.g., MME or SGSN) 106 and a packet data network 110 (e.g., the Internet). In embodiments where core network 104 is an evolved packet core (EPC), gateway 109 may comprise a serving gateway (SGW) and a packet data network (PDN) gateway (PGW) and management entity 106 is an MME. In embodiments in which core network 104 is general packet radio service (GPRS) core network, management entity 106 is a serving GPRS support node (SGSN) and gateway 109 is a gateway GPRS support node (GGSN). While this disclosure may use fourth generation (4G) and/or third generation (3G) defined components to illustrate various embodiments, the disclosure is not limited to a 4G or 3G network, but is also applicable to other networks.

This disclosure describes an APN based group congestion control mechanism in which no subscription parameter updates or protocol updates are needed, only updates to the APN based congestion control logic in the ME 106. Such an APN based group congestion control mechanism utilizes a Group Defining APN (GDA), which is a particular APN that is present in the subscription data for each terminal that is a member of a particular group, which group is defined by the GDA, where the GDA is preferably not used for connectivity in the network. Thus, the ME 106 can determine whether a terminal is member of a particular group based on presence of a particular APN in the subscription data for the terminal. That is, a terminal is a member of particular group defined by a particular GDA if the subscription data for the terminal includes the GDA. By enabling the ME 106 to determine whether a terminal is a member of a particular group of terminals, the ME 106 can perform group based control, such as group based congestion control. The only deployment needed is thus configuration of APN records in subscription data and no further deployment in other network entities. For example, no deployment in Domain Name System (DNS) servers is needed. That is, for example, a GDA is an APN that is not mapped to any IP address by any DNS server or the like. To avoid a GDA being used by terminals in connectivity requests, a network operator typically only adds the GDA in the network and not in terminal configuration data. There is no difference in the required ME 106 configuration to define applicable trigger conditions to start and stop APN based group congestion control compared to the existing APN based congestion control.

For APN based group congestion control, the following is non-exhaustive list of criteria that can be used to determine whether to restrict a terminal's access to a requested resource: 1) the number of EPS bearers active for the terminals with the GDA in the subscription; 2) the rate of EPS Bearer activations using any APN by the terminals with the Group Defining APN in the subscription; 3) terminals with the Group Defining APN in the subscription are restricted when another APN is not reachable; 4) maximum rate of MM signaling requests associated with the devices with a particular subscribed GDA; and 5) Setting in network management.

Figure 2:
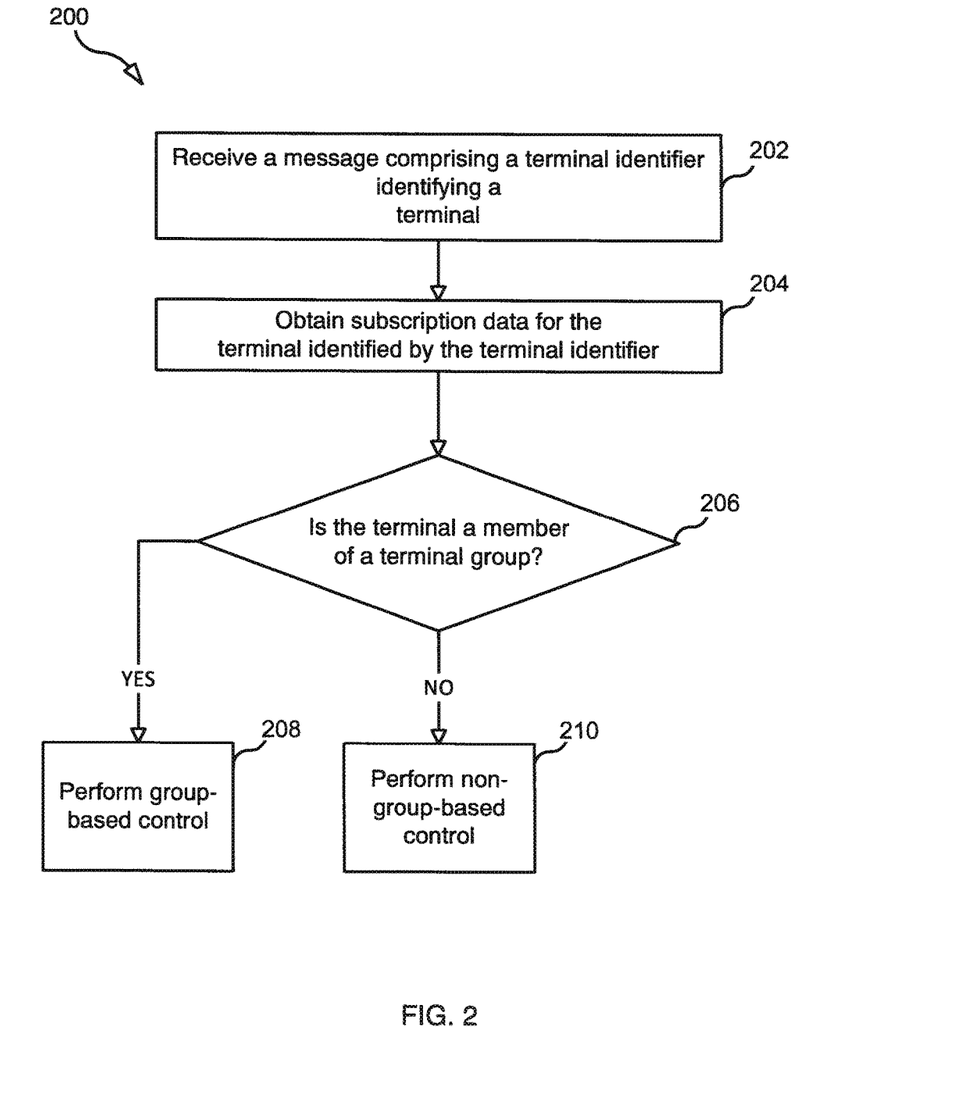
FIG. 2 is a flow chart illustrating a process, according to some embodiments.

FIG. 2 is a flow chart 200 according to one embodiment of the disclosure. As shown, in step 202, ME 106 receives a message (e.g., message 502 shown in FIG. 5) that includes a terminal identifier identifying a terminal (e.g., terminal 101). The ME 016, as described above may be an MME or an SGSN depending on the type of the core network which the terminal seeks to utilize. Further, the terminal 101 may be a wireless communication device, such as a smartphone, a sensor, a computer, etc.

In some embodiments, message 502 comprises or consists of a connectivity request message (e.g., an Activate PDP context message or a PDN connectivity request message), which connectivity request message comprises an APN. In some embodiments in which ME is an SGSN, message 502 may be an Attach Request.

At step 204, the ME 106 obtains subscription data for the terminal identified by the terminal identifier included in message 502. The subscription data comprises a list of one or more APNs.

Figure 5:
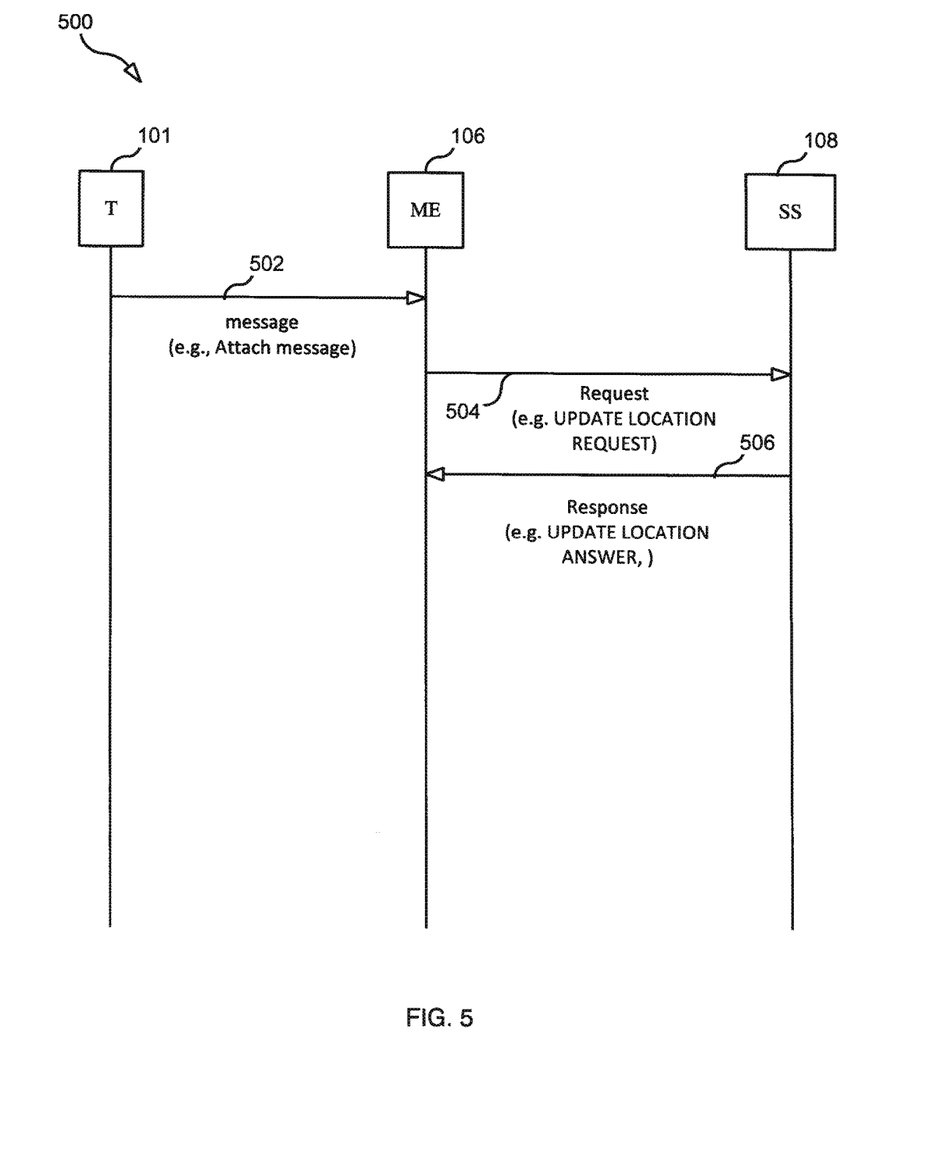
FIG. 5 is a message flow diagram according to one scenario.

In some embodiments, obtaining the subscription data for the terminal comprises the ME 106 transmitting a request message 504 to a subscriber server (SS) 108 (e.g., a Home Location Register (HLR) or a Home Subscriber Server (HSS)), which, in response to the message transmits to the ME 106 a response message 506. In some embodiments, request message 504 is an Update Location Request, and response message 506 is an Update Location Answer that includes a "Subscription Data" information element (IE) that contains subscription data. For example, the Subscription Data IE may contain the complete subscription profile associated with the terminal, which subscription profile includes an APN-Configuration-Profile that includes, among other things, the list of APNs and the Internet Protocol (IP) address of a PDN gateway, which may be used to determine a default traffic route, and may further include an IP address assigned to the terminal. Message 506 could also be, for example, an Insert Subscriber Data message. In other embodiments, message 502 is a MAP_UPDATE_GPRS_LOCATION message.

Figure 7:
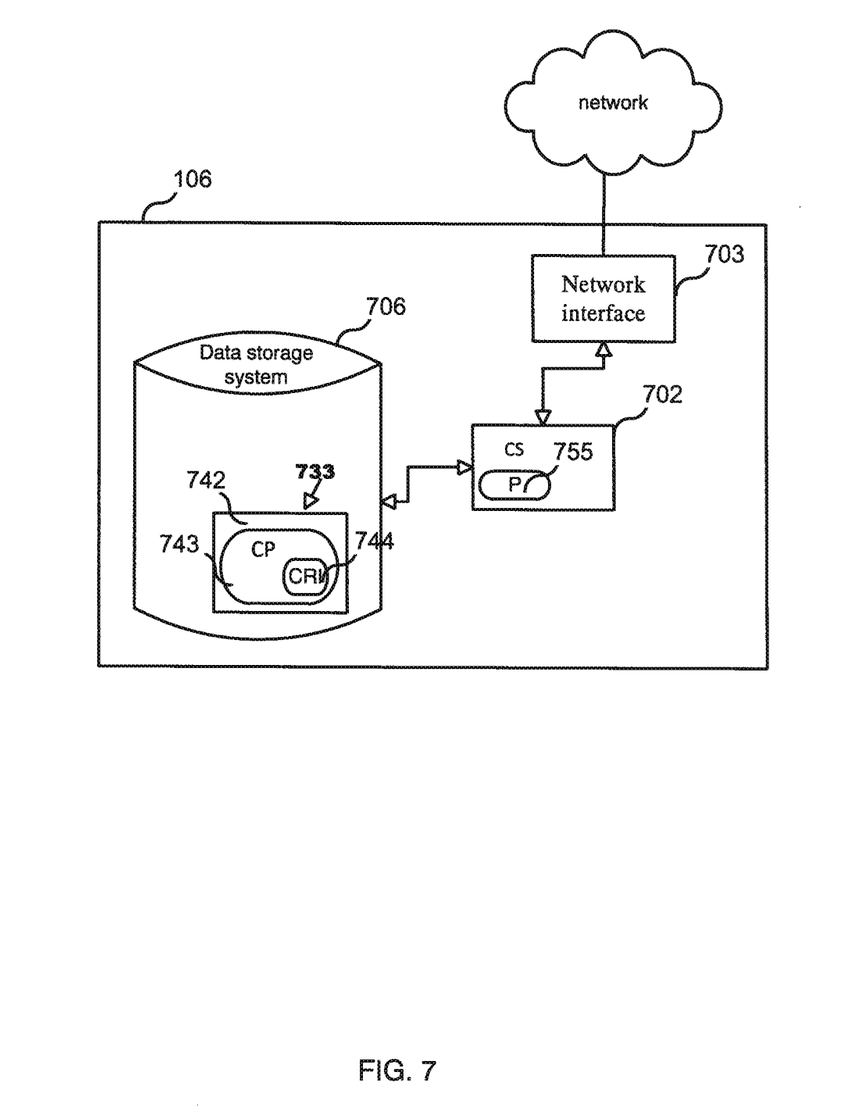
FIG. 7 is a block diagram of a management entity according to some embodiments.

In other embodiments, the step of obtaining the subscription data for the terminal comprises the ME 106 retrieving the subscription data from a local data storage system (see e.g., element 706 of FIG. 7). For example, ME 106 in response to an attach message from the terminal may obtain the subscription data from SS 108 and then cache the subscription data in storage system 706 so that it can be used at a later time (e.g., so that it can be used when ME 106 receives a connectivity request from the terminal). Accordingly, while step 204 is shown as being performed after step 202, this is not a requirement as there are embodiments in which step 204 is performed before step 202.

At step 206, the ME 106 uses the list of APNs to determine whether the terminal is a member of a particular group of terminals. For example, the determination may be based on whether the list of APNs obtained in step 204 includes the particular GDA that identifies the particular terminal group. Thus, in step 206, ME 106 may compare a previously obtained and stored GDA with each APN included in the list of APNs and will determine that the terminal is a member of the terminal group if ME 106 finds that the list of APNs includes the GDA in question. In that regard, the terminal is a member of the terminal group defined by the particular GDA if the subscription data associated with the terminal includes that particular GDA. As such, when the ME 106 determines that the terminal is a member of the terminal group, the ME 106 can perform certain group-based control at step 208 (e.g., group based congestion control). Otherwise, the ME 106 performs certain non-group-based control at step 210.

In some embodiments, the list of APNs comprises a first APN that is used as a default APN and a second APN that is a Group Defining APN (GDA), wherein the second APN is different than the first APN. In some embodiments, the list of APNs comprises a first APN, which comprises a first network identifier, and the list of APNs further comprises a second APN, which comprises a second network identifier. The first APN may further comprise a first operator identifier and the second APN may further comprise a second operator identifier.

In some embodiments, the list of APNs comprises a first APN for use in identifying one or more of: an access point and a packet data network (PDN), and the list of APNs further comprises a second APN solely for use in identifying a terminal group to which the terminal belongs.

Figure 3:
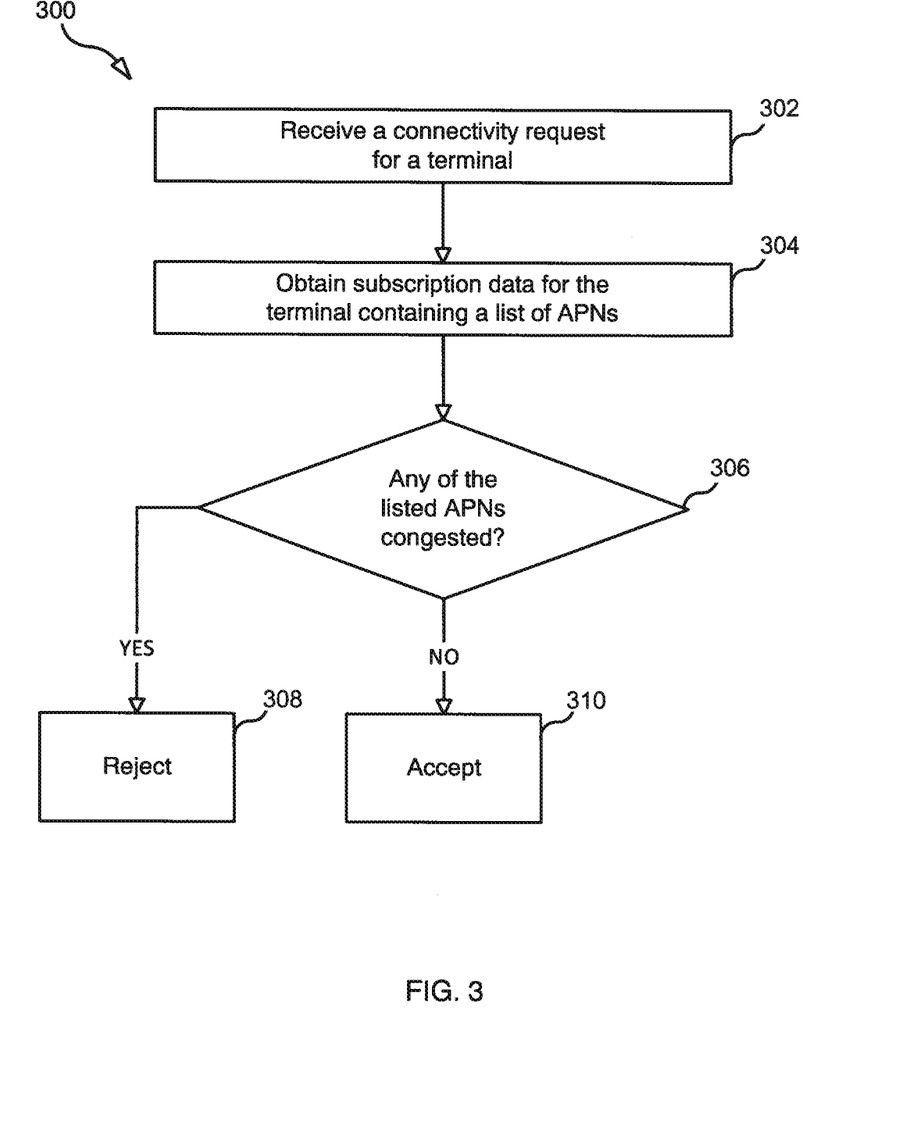
FIG. 3 is a flow chart illustrating a process, according to some embodiments.

FIG. 3 is a flow chart 300 in accordance with another embodiment of the disclosure. At step 302, ME 106 receives a connectivity request message 602 (see FIG. 6) identifying a terminal (the message may also include an APN). In a 4G LTE network, for example, the connectivity request message may be a message requesting a Public Data Network (PDN) connection and may include at least an attach request, a connection request, various information associated with the terminal, as well as information identifying APNs. In a 3G network, the data connectivity request may be an Activate Packet Data Protocol (PDP) Context.

Figure 6:
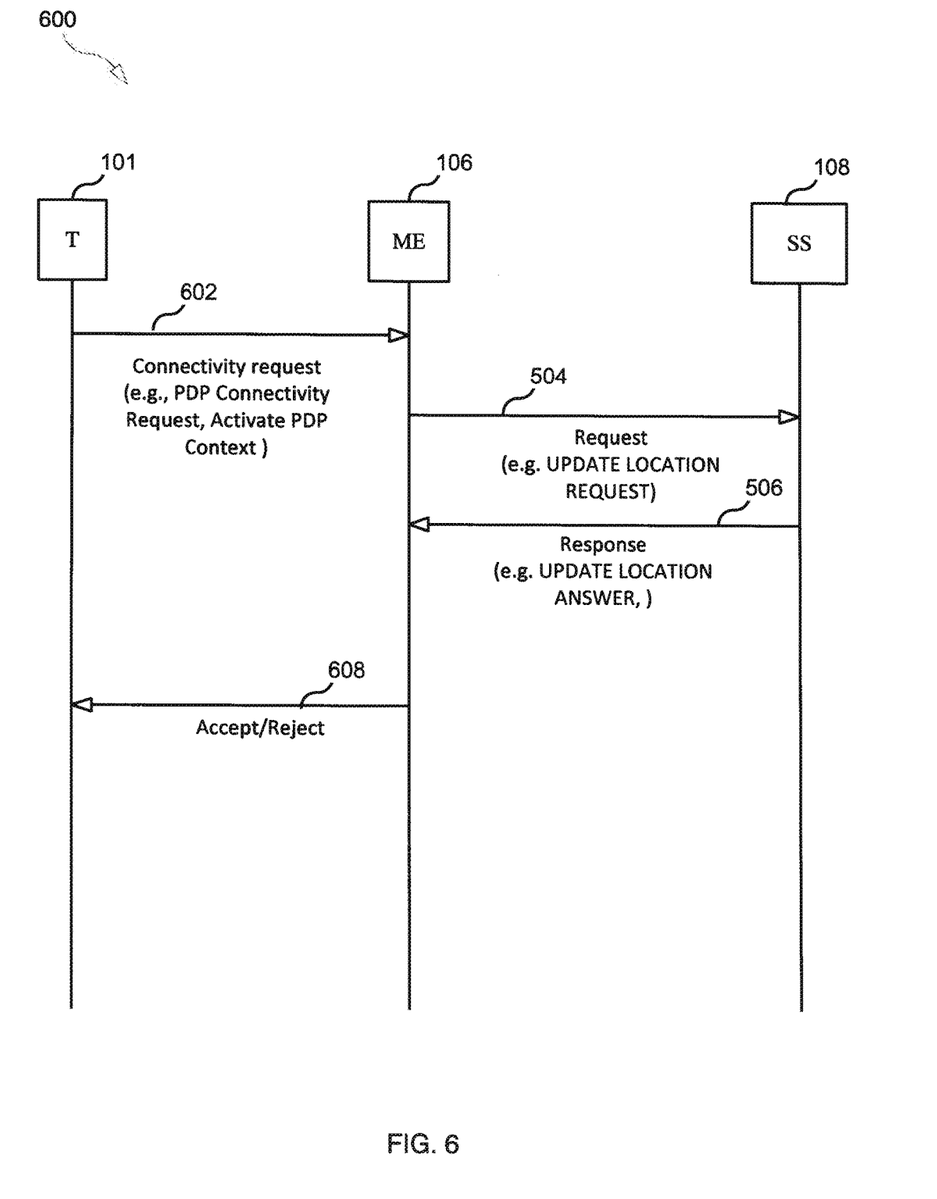
FIG. 6 is a message flow diagram according to one scenario.

In step 304 the ME 106 obtains subscription data for the terminal containing a list of APNs. Depending on the type of network, the manner in which ME 106 obtains the subscription data may vary. For example, ME 106 may obtain the subscription data from an HSS in response to receiving an PDN Connection Request message (as seen in FIG. 6, the ME 106 may send to SS 108 a request 504, and in response, the ME 106 receives a response 506 containing subscription data). As another example, ME 106 may obtain the subscription data from internal memory in response to receiving message 602.

At step 306, the ME 106 determines whether any of the listed APNs in the subscription data is congested. If yes, the ME 106 may reject the connectivity request for the terminal at step 308. If no, the ME 106 may accept the data connectivity request and proceed to connect the terminal to the network. By way of example, a rejection at step 308 may be a rejection message 608 indicating that no resources are available or that there is congestion for the relevant APNs. Additionally, the rejection message may also include a value of a back-off timer from the network.

In some embodiments, ME 106 determines whether any of the listed APNs is congested by evaluating a parameter associated with the APN. For example, the parameter may be a value identifying an number of active bearers and the evaluation of the parameter may comprise determining whether the parameter exceeds a threshold, wherein the ME 106 determines that an APN is congested is the parameter exceeds the threshold.

Figure 4:
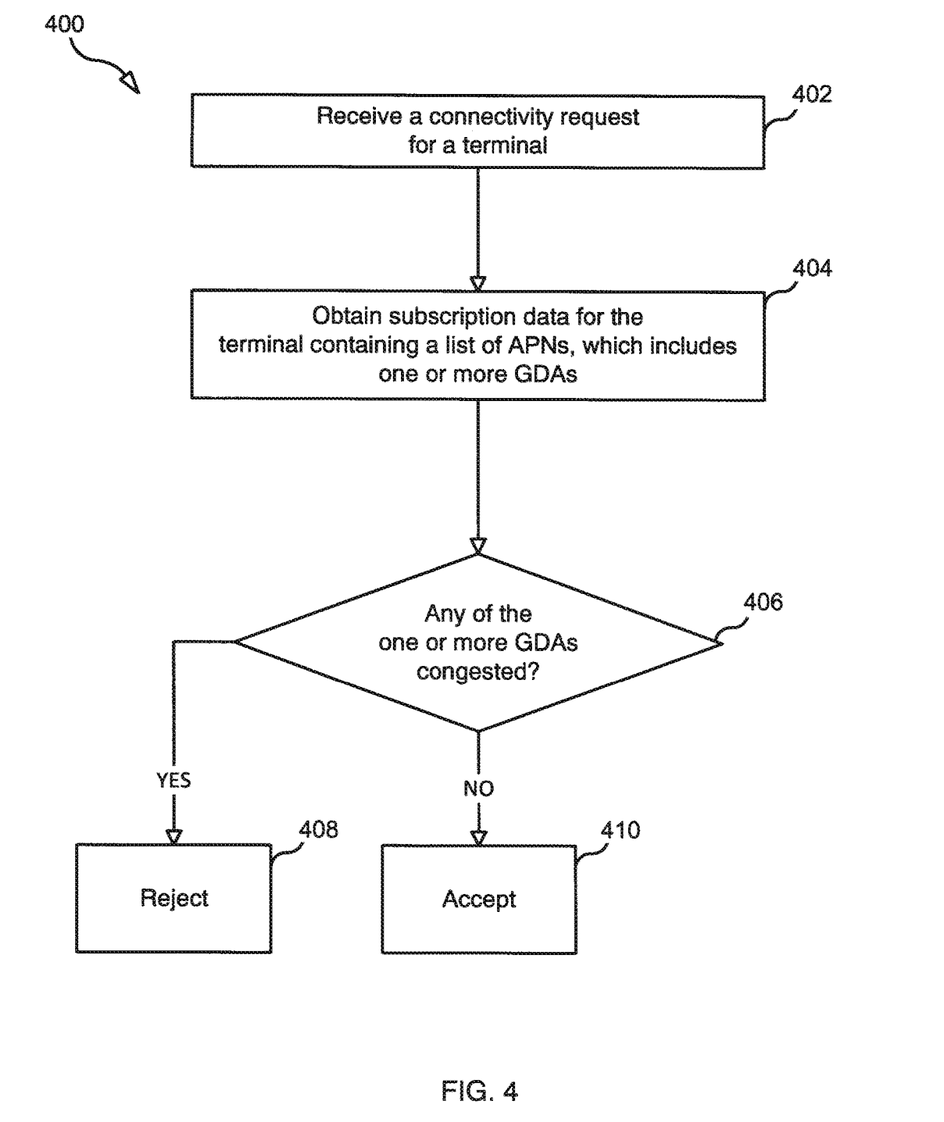
FIG. 4 is a flow chart illustrating a process, according to some embodiments.

FIG. 4 is a flow chart 400 in accordance with yet another embodiment of the disclosure. In this embodiment, the ME 106 rejecting or accepting a data connectivity request for a terminal is based on whether one or more GDAs is congested. For instance, the ME 106 receives the data connectivity request 602 for the terminal at step 402. In step 404, the ME 106 obtains subscription data for the terminal containing a list of APNs, which includes one or more GDAs. The ME 106 determines whether any of the one or more GDAs included in the subscription data is congested at step 406. If one or more of the GDAs is congested, the ME 106 may reject the data connectivity request at step 408. If not, the ME 106 may accept the data connectivity request at step 410. Similar to FIG. 3, the rejection of the data connectivity request may be a reject message, which may indicate that the APN is unavailable or congested, or may include a value of a back-off timer.

FIG. 5 is a message diagram 500 depicting a message flow, according to some embodiments, among at least terminal 101, ME 106, and SS 108. As shown, the terminal 101 sends a request 502 to ME 106. The request may include a terminal identifier identifying the terminal. Subsequently, the ME 106 sends to SS 108 a request 504 containing the terminal identifier to, among other things, obtain subscription data for the terminal, which data includes a list of one or more APNs. In response, SS 108 transmits a response 506 that includes the requested subscription data for the terminal. After the ME 106 receives the subscription data, it is uses the list of APNs to determine whether the terminal is a member of a terminal group. If the terminal is a member of a terminal group, then ME 106 may perform group control (e.g., group congestion control). While FIG. 5 depicts successive messages communicated among terminal 101, ME 106, and SS 108, it should be understood that there may be additional messages in between the depicted messages 502, 504, 506, and 508.

FIG. 6 is a message diagram 600 depicting a message flow, according to some embodiments, among at least terminal 101, ME 106, and SS 108. As shown, the terminal 101 sends a connectivity request 602 to ME 106. The connectivity request may include a terminal identifier identifying the terminal, APN information, etc. Subsequently, the ME 106 sends to SS 108 request 504 containing the terminal identifier to, among other things, obtain subscription data for the terminal, which record may include a list of one or more APNs. In response, SS 108 transmits a response 506 that includes the requested subscription data for the terminal. After the ME 106 receives the subscription data, it determines whether to accept/reject 608 the data connectivity request 602 from the terminal 101. While FIG. 6 depicts successive messages communicated among terminal 101, ME 106, and SS 108, it should be understood that there may be additional messages in between the depicted messages 602, 604, 606, and 608.

FIG. 7 is a block diagram of an embodiment of ME 106. As shown in FIG. 7, ME 106 may include or consist of: a computer system (CS) 702, which may include one or more processors 755 (e.g., a general purpose microprocessor and/or one or more circuits, such as an application specific integrated circuit (ASIC), field-programmable gate arrays (FPGAs), a logic circuit, and the like); a network interface 703, comprising a transmitter and a receiver (e.g., a transceiver), for use in connecting ME 106 to a network; and a data storage system 706, which may include one or more non-volatile storage devices and/or one or more volatile storage devices (e.g., random access memory (RAM)). In embodiments where ME 106 includes a processor 755, a computer program product (CPP) 733 may be provided. CPP 733 includes or is a computer readable medium (CRM) 742 storing a computer program (CP) 743 comprising computer readable instructions (CRI) 744. CRM 742 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 744 of computer program 743 is configured such that when executed by computer system 702, the CRI causes the ME 106 to perform steps described above (e.g., steps described above with reference to the flow charts and message flows shown in the drawings). In other embodiments, ME 106 may be configured to perform steps described herein without the need for a computer program. That is, for example, computer system 702 may consist merely of one or more ASICs. Hence, the features of the embodiments described herein may be implemented in hardware and/or software.

Figure 8:
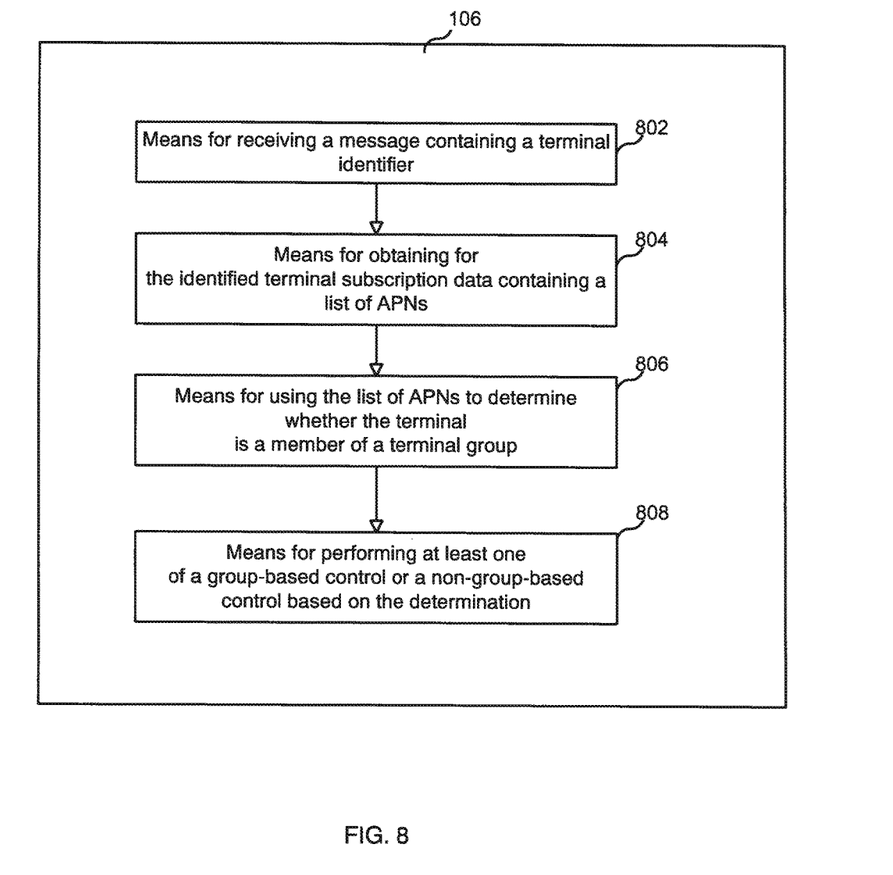
FIG. 8 is functional block diagram of a management entity according to some embodiments.

FIG. 8 is a functional block diagram of ME 106 according to some embodiments. In the embodiment shown, ME 106 comprises: means (802) for receiving a message containing a terminal identifier; means (804) for obtaining for the identified terminal subscription data containing a list of APNs; means (806) for using the list of APNs. to determine whether the terminal is a member of a terminal group; and means (808) for performing at least one of a group-based control or a non-group-based control based on the determination.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for enabling group control of terminals, the method being performed by a management entity, and the method comprising:
the management entity storing a group identifier (GID) identifying a particular group of terminals;
the management entity receiving a message comprising a terminal identifier identifying a particular terminal;
the management entity obtaining subscription data for the particular terminal, the subscription data comprising a list of access point names (APNs), the list of APNs comprising a first APN that is a default APN for the particular terminal and a second APN that is a Group Defining APN (GDA), wherein the GDA is different than the first APN; and
the management entity using the list of APNs to determine that the terminal is a member of the particular group of terminals, wherein
the step of using the list of APNs included in the subscription data to determine that the terminal is a member of the particular group of terminals, comprises: (i) the management entity obtaining the GDA from the list of APNs included in the subscription data, (ii) the management entity comparing the GDA obtained from the list of APNs with the stored GID, and (iii) the management entity, based on the comparing, determining that the GDA is identical to the stored GID.

2. The method of claim 1, wherein the GDA is not used for providing any connectivity to the terminal.

3. The method of claim 1, wherein
the message is a connectivity request message that comprises an APN, and
the method further comprises: the management entity determining that a congestion parameter associated with the GID exceeds a congestion threshold; and the management entity, in response to the connectivity request message and as a result of determining that the congestion parameter associated with the GID exceeds the congestion threshold, transmits to the terminal a connectivity rejection message.

4. The method of claim 3, wherein the connectivity rejection message indicates to the terminal that the network resources are not available to provide the requested connectivity.

5. The method of claim 3, wherein the connectivity rejection message indicates to the terminal an amount of time the terminal should wait before resending the connectivity request.

6. The method of claim 3, wherein the congestion parameter identifies at one of: 1) the number of Evolved Packet System, EPS, bearers active for the terminals that are members of the group identified by the group identifier; and 2) a rate of EPS Bearer activations.

7. The method of claim 1, wherein
the first APN comprises a first network identifier, and
the GDA comprises a second network identifier that is different than the first network identifier.

8. The method of claim 7, wherein the first APN further comprises a first operator identifier and the GDA comprises a second operator identifier.

9. The method of claim 1, wherein obtaining the subscription data comprises obtaining the subscription data from a subscriber server.

10. The method of claim 9, wherein obtaining the subscription data from the subscription server comprises transmitting to the subscription server a message and receiving, in response to the message, a response message comprising a list of APNs.

11. A computer program product comprising a non-transitory computer readable medium storing computer readable instructions for enabling a management entity to perform the method of claim 1.

12. The method of claim 1, wherein
the message comprising the terminal identifier identifying the particular terminal is an Attach Request message,
the management entity obtains the subscription data for the particular terminal in response to receiving the Attach Request message,
the management entity obtains the subscription data for the particular terminal by transmitting to a Home Subscriber Server (HSS) an Update Location Request and receiving from the HSS an Update Location Answer comprising the subscription data for the particular terminal, and
the subscription data comprises an APN-Configuration-Profile that comprises the set of APNs.

13. A method for enabling group control of terminals, the method being performed by a management entity, and the method comprising:
the management entity receiving a message comprising a terminal identifier identifying a terminal;
the management entity obtaining subscription data for the terminal, the subscription data comprising a list of access point names (APNs);
the management entity using the list of APNs to determine that the terminal is a member of a particular group of terminals, wherein
the list of APNs comprises a first APN for use in identifying one or more of: an access point and a packet data network, and
the list of APNs further comprises a second APN solely for use in identifying a terminal group to which the terminal belongs.

14. A management entity apparatus, comprising:
a network interface comprising a receiver for receiving a message comprising a terminal identifier identifying a terminal;

a data storage system comprising one or more non-volatile storage devices, the data storage system storing a group identifier (GID) identifying a particular group of terminals; and
a computer system coupled to the data storage system, the computer system comprising one or more processors, wherein the computer system is configured such that, as a result of the computer system receiving said message, the computer system:
obtains subscription data for the terminal, the subscription data comprising a list of access point names (APNs), the list of APNs comprising a first APN that is a default APN for the particular terminal and a second APN that is a Group Defining APN (GDA), wherein the GDA is different than the first APN, and
uses the list of APNs to determine whether the terminal is a member of the particular group of terminals, wherein
the computer system uses the list of APNs to determine whether the terminal is a member of the particular group of terminals by performing a process comprising: (i) obtaining the GDA from the list of APNs, (ii) comparing the GDA with the stored GID, and (iii) based on the comparing, determining whether the GDA is identical to the stored GID.

15. The management entity apparatus of claim 14, wherein
the message is a connectivity request message that comprises an APN, and
the computer system is further configured to: determine whether a congestion parameter associated with the GID exceeds a congestion threshold, and, as a result of determining that the congestion parameter associated with the GID exceeds the congestion threshold, employ the network interface to transmit to the terminal a connectivity rejection message.

16. The management entity apparatus of claim 14, wherein
the first APN comprises a first network identifier and a first operator identifier, and
the GDA comprises a second network identifier that is different than the first network identifier.

17. The management entity apparatus of claim 14, wherein
the first APN is for use in identifying one or more of: an access point and a packet data network, and
the GDA is solely for use in identifying a terminal group to which the terminal belongs.

18. A method being performed by a management entity, the method comprising:
the management entity receiving a connectivity request comprising a terminal identifier identifying a terminal;
the management entity obtaining subscription data for the terminal, the subscription data comprising a set of access point names (APNs);
the management entity determining that one of the APNs included in set of APNs is congested; and
as a result of determining that one of the APNs included in set of APNs is congested, the management entity rejecting the connectivity request, wherein
the management entity is one of: (i) a Mobility Management Entity (MME) of a evolved packet core (EPC) network and (ii) a Serving GPRS Support Node (SGSN) of a general packet radio service (GPRS) core network, and
said set of APNs consists only of APNs that are used only for identifying a terminal group to which the terminal belong.

19. The method of claim 18, wherein
the connectivity request is one of: a PDN Connectivity request and an Attach Request,
the management entity obtains the subscription data for the terminal by transmitting to a Home Subscriber Server (HSS) an Update Location Request and receiving from the HSS an Update Location Answer comprising the subscription data for the terminal, and
the subscription data comprises an APN-Configuration-Profile that comprises the set of APNs.

20. A management entity apparatus, comprising:
a network interface comprising a receiver for receiving a connectivity request comprising a terminal identifier identifying a terminal;
a data storage system comprising one or more non-volatile storage devices; and
a computer system coupled to the data storage system, the computer system comprising one or more processors, wherein the computer system is configured such that, as a result of the computer system receiving said connectivity request, the computer system:
transmits to a subscription server (SS) a request for subscription data for the terminal, the subscription data comprising a set of access point names (APNs);
obtains the requested subscription data for the terminal;
determines whether any one of the APNs included in said set of APNs is congested; and
rejects the connectivity request as a result of determining that any one of the APNs included in said set of APNs is congested, wherein
the management entity apparatus comprises one of: (i) a Mobility Management Entity (MME) of a evolved packet core (EPC) network and (ii) a Serving GPRS Support Node (SGSN) of a general packet radio service (GPRS) core network, and
said set of APNs consists only of APNs that are used only for identifying a terminal group to which the terminal belong.

* * * * *

UNITED STATES PATENT AND TRADEMARK OFFICE
CERTIFICATE OF CORRECTION

PATENT NO. : 10,321,354 B2
APPLICATION NO. : 14/877252
DATED : June 11, 2019
INVENTOR(S) : Wass et al.

Page 1 of 1

It is certified that error appears in the above-identified patent and that said Letters Patent is hereby corrected as shown below:

In the Specification

In Column 3, Line 53, delete "is functional" and insert -- is a functional --, therefor.

In Column 7, Lines 9-10, delete "it is uses" and insert -- it uses --, therefor.

Signed and Sealed this
Fifth Day of November, 2019

Andrei Iancu
*Director of the United States Patent and Trademark Office*